United States Patent
Werner et al.

(10) Patent No.: US 8,484,327 B2
(45) Date of Patent: Jul. 9, 2013

(54) METHOD AND SYSTEM FOR GENERIC REAL TIME MANAGEMENT OF DEVICES ON COMPUTERS CONNECTED TO A NETWORK

(75) Inventors: Eran Werner, Raanana (IL); Elad Zucker, Netanya (IL); Ben Matzkel, Tel-Aviv (IL)

(73) Assignee: McAfee, Inc., Santa Clara, CA (US)

( * ) Notice: Subject to any disclaimer, the term of this patent is extended or adjusted under 35 U.S.C. 154(b) by 1011 days.

(21) Appl. No.: 11/979,684

(22) Filed: Nov. 7, 2007

(65) Prior Publication Data

US 2009/0119743 A1 May 7, 2009

(51) Int. Cl.
*G06F 15/173* (2006.01)
(52) U.S. Cl.
USPC ............ 709/223; 709/224; 709/225; 726/6; 726/27
(58) Field of Classification Search
USPC ............... 709/203, 223–225; 714/4; 726/11, 726/6, 27
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,990,601 B1* | 1/2006 | Tsuneya et al. | 714/4 |
| 7,467,143 B2* | 12/2008 | Nojima | 1/1 |
| 7,506,155 B1 | 3/2009 | Stewart et al. | |
| 7,526,800 B2* | 4/2009 | Wright et al. | 726/11 |
| 2002/0133539 A1* | 9/2002 | Monday | 709/203 |
| 2004/0252837 A1* | 12/2004 | Harvey et al. | 713/153 |
| 2005/0114474 A1* | 5/2005 | Anderson et al. | 709/220 |
| 2006/0236408 A1* | 10/2006 | Yan | 726/29 |
| 2007/0233842 A1* | 10/2007 | Roberts et al. | 709/223 |
| 2007/0250910 A1* | 10/2007 | Miller et al. | 726/4 |
| 2008/0109679 A1* | 5/2008 | Wright et al. | 714/37 |
| 2009/0037594 A1* | 2/2009 | Sever et al. | 709/230 |
| 2009/0193524 A1* | 7/2009 | Shoji et al. | 726/27 |

* cited by examiner

*Primary Examiner* — Oanh Duong
(74) *Attorney, Agent, or Firm* — Patent Capital Group

(57) ABSTRACT

A method and system for enterprise device management allows the administrator to set a policy of forbidden devices, monitor devices used in the organization, provide alerts and notification incase an unknown device is connected to a computer, and monitor or block connections of devices which do not comply with the said security policy. A method for device management in a computer system comprises detecting connection of a device to the computer system and determining a reaction to perform in response to the connection of the device to the computer system based on parameters related to the device and on device management rules.

25 Claims, 4 Drawing Sheets

METHOD AND SYSTEM FOR GENERIC REAL TIME MANAGEMENT OF DEVICES ON COMPUTERS CONNECTED TO A NETWORK

BACKGROUND OF THE INVENTION

1. Field of the Invention

The present invention relates to methods and systems for device management and more particularly to a method and system for generic real time management of devices connected to computers on a network, using host based agents, and rules-based policies.

2. Description of the Related Art

Device management is a crucial tool for enforcement of security policies. The enormous variety of available devices poses a threat of data loss, data theft and malicious intrusion. There is a need for organizations to be able to determine which devices are forbidden, and what constrains should be applied on allowed devices. The rapid introduction of new devices creates a need for generic management of devices so that unfamiliar devices will be managed as well.

A need arises for a technique by which devices can be generically managed, so as to control the enforcement of security policies, prevent the use of unauthorized devices and prevent the loss of data.

SUMMARY OF THE INVENTION

The present invention provides a method for enterprise device management which allows the administrator to set a policy of forbidden devices, monitor devices used in the organization, provide alerts and notification incase an unknown device is connected to a computer, and monitor or block connections of devices which do not comply with the said security policy. The present invention further comprises means of controlling data flow to connected devices according a security policy. The security policy contains definitions of devices according to device parameters.

A method is disclosed for implementing a rule-based policy for device management in an enterprise system. The system for implementing the method includes a plurality of computers, pluggable devices which can be connected to computers, and a policy consisting of a plurality of Rules. The system also includes a software agent installed on each of the plurality of computers, operative in a manner which enables it to perform the functions of the method. The functions include tracking attempts to connect pluggable devices to computers, retrieving the device specific parameters and parameters concerning the identity of the computer hosting the device and the user logged to the computer, evaluating if the said parameters violate any of a plurality of rules of the policy and blocking the initialization, altering the access control list of the device, or limiting the data flow to the device if dictated by the policy. The functions also include means of generating an event describing the incident of a device plug, and reporting this event details to a logging server that can be viewed by the administrator. The system also includes a management Console for setting the policy and reviewing the Event Descriptions.

A method for device management in a computer system comprises detecting connection of a device to the computer system and determining a reaction to perform in response to the connection of the device to the computer system based on parameters related to the device and on device management rules. Each device management rule may comprise a combination of device definitions that will trigger the rule, each device definition corresponding to a set of devices and comprising a plurality of parameters associated with these devices, information relating to the users and computer systems to which the rule will be applied, and a reaction to be performed when the rule is triggered. A reaction to be performed may comprise at least one of monitoring and reporting connection of the device, blocking initialization of the device altering the access control list of the device, or limiting the data flow to the device, and notifying a user connecting the device that the device connection is monitored or blocked.

The parameters related to the device definition may comprise generic parameters associated with the devices. The generic parameters may comprise at least one of a device class, a device name, a bus type the devices connect to, a vendor of the devices, a product ID of the devices, and a device specific serial number. The parameters related to the devices may further comprise device specific parameters related to the device and wherein a reaction to be performed comprises a device specific reaction. The devices may be removable storage devices and the device specific parameters may comprise at least one of a file system type of the device, a volume label of the device, a serial number of the device, and free storage space on the device. The device specific reaction may comprise at least one of allowing the device to work, block writing to the device or preventing any access to the device. The device may be a network adapter and the device specific parameters may comprise at least one of a type of network, a name of a network connection, bandwidth parameters, and presence of other networks connected simultaneously. The device specific reaction may comprise restriction according to network protocol, or restriction according to specific access points.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides a method for enterprise device management which allows the administrator to set a policy of forbidden devices, monitor devices used in the organization, provide alerts and notification incase an unknown device is connected to a computer, and monitor or block connections of devices which do not comply with the said security policy. The security policy contains definitions of devices according to device parameters.

Figure 1:
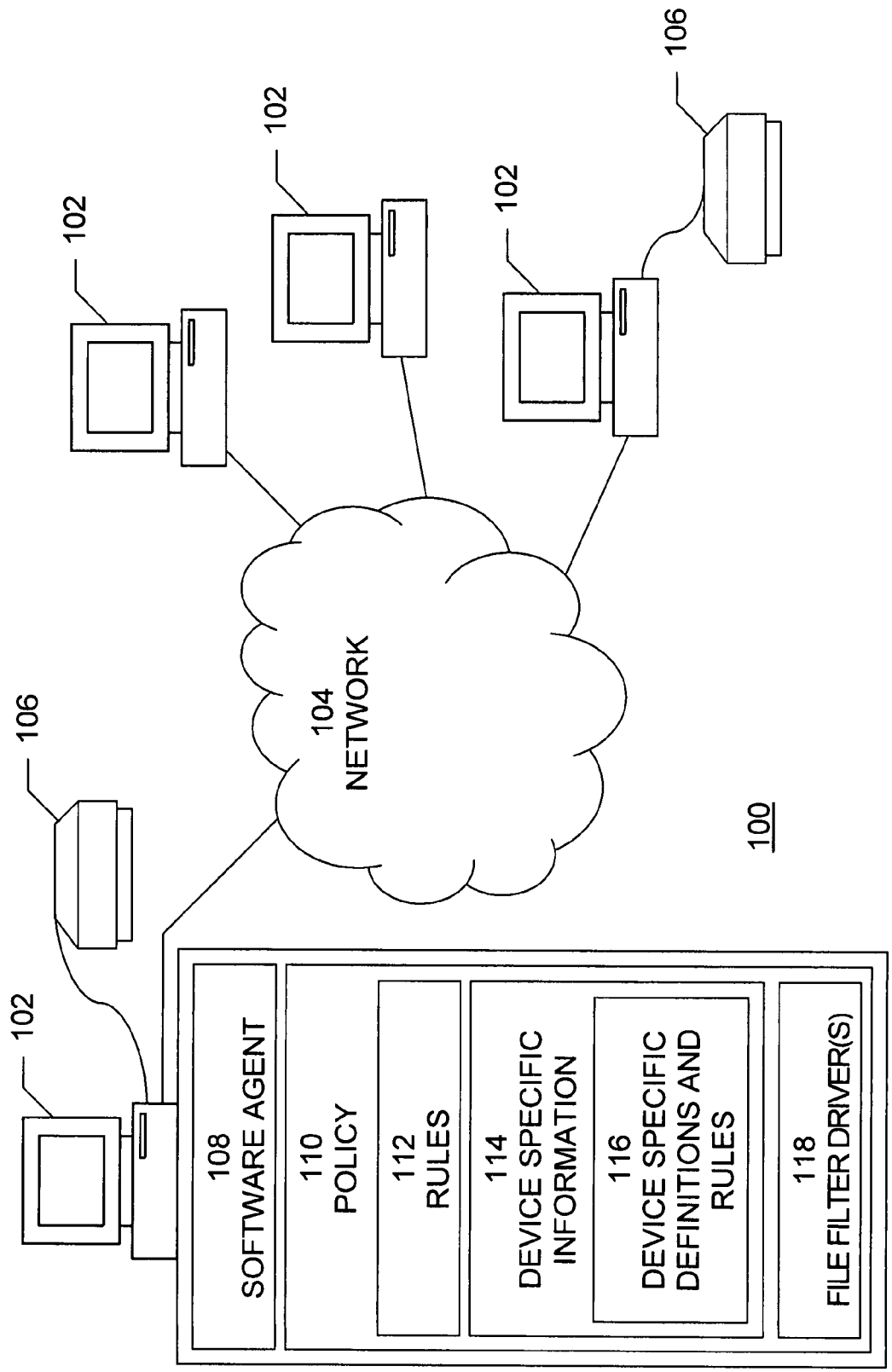
FIG. 1 is an exemplary block diagram of a software environment, such as in a host computer system, in which the present invention may be implemented.

FIG. 1 illustrates a network environment 100, in which the present invention may be implemented. Network environment 100 includes a plurality of computer systems 102, a communications network 104, and a plurality of pluggable/removable devices 106. Computer systems 102 are typically programmed general-purpose computer systems, such as personal computers, workstations, server systems, and minicomputers or mainframe computers, but may also include specialpurpose, embedded, or other types of computer systems. Network 104 includes one or more communication networks, which may be public or private, standard or proprietary, local or wide-area. Examples of such networks include, but are not limited to, one or more standard local area networks (LAN) or wide area networks (WAN), such as Ethernet, Token Ring, the Internet, or a private or proprietary LAN/WAN. Pluggable/removable devices 106 include any devices that may be inserted into, connected to, or plugged into a computer system 102, and which may be removed from, disconnected from, or unplugged from a computer system 102. Examples of such devices include, but are not limited to, storage devices, such as flash memory drives, memory cards, removable hard drives or optical drives, etc. Typical interfaces used to connect such device include Universal Serial Bus (USB), IEEE-1394, external Serial Advanced Technology Attachment (eSATA), etc.

Each of the plurality of computer systems 102 includes a software agent 108, and a policy 110, which includes a plurality of rules 112 and may include device specific information 114 (described below). Software agent 108 performs a number of functions including tracking attempts to connect pluggable devices to computers, retrieving the device specific parameters and parameters concerning the identity of the computer hosting the device and the user logged to the computer, evaluating if the parameters violate any of a plurality of rules 112 of the policy 110 and blocking the initialization of the device if dictated by the policy. Software agent 108 also generates events describing the incident of a device plug, and reporting the event details to a logging server that can be viewed by the administrator. A management Console may be used for viewing and setting the policy 110 and reviewing the Event Descriptions.

Policy 110 is a definition of the security behavior for computer system 108. Policy 110 may define constraints on functions of attached devices and flows of data among the devices, as well constraints on access by external systems, specified programs, and specified people. Policy 110 includes rules 112, which are definitions of generic parameters and values of those parameters that are used to determine the security behavior of computer system 108 with respect to pluggable/removable devices. Examples of such generic parameters include, but are not limited to, the device class, the device name, the bus type the device connects to, the vendor or product ID of the device, the device specific serial number, etc.

Figure 2:
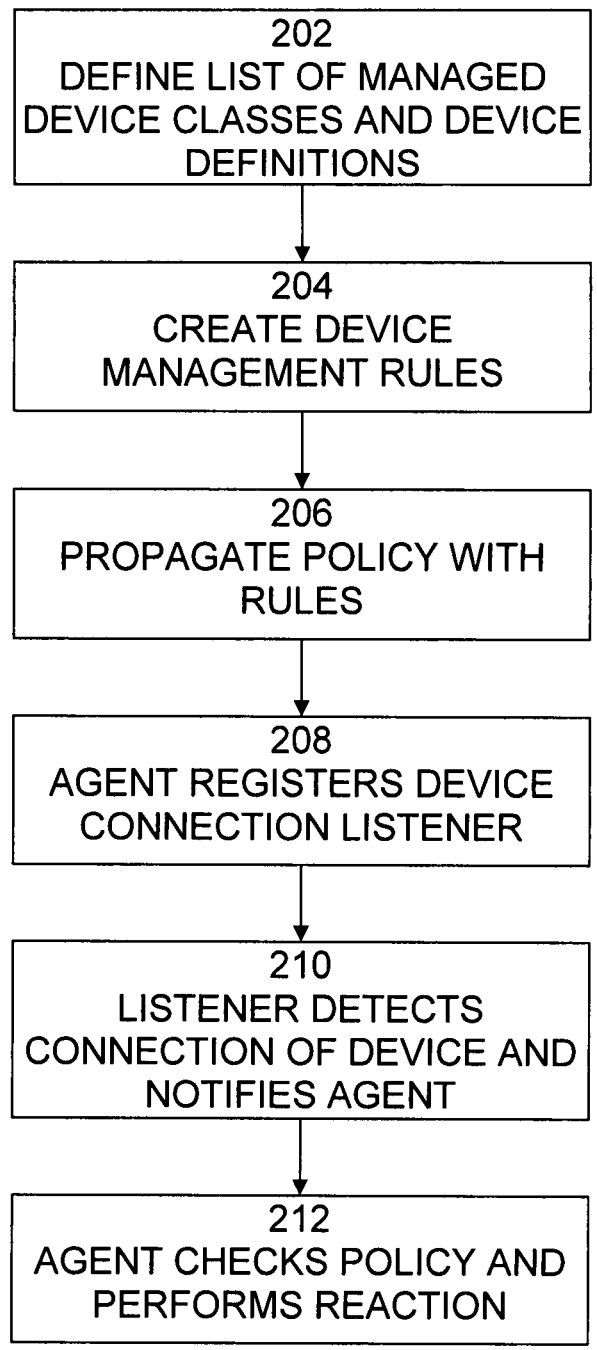
FIG. 2 is an exemplary flow diagram of a process generic device management

An exemplary process of generic device management 200 is shown in FIG. 2, which is best viewed in conjunction with FIG. 1. Process 200 begins with step 202, in which a System Administrator defines a list of managed device classes. Furthermore, the administrator defines a set of device definitions. Device definitions comprise various device parameters such as device name, device class, serial number, vendor id, product id, etc. The parameters are used to create a Boolean predicate that matches a set of devices.

In step 204, the administrator uses the device definitions to create a plurality of device management rules 112. Each rule describes the device definitions which will trigger the rule. Any combination of the definitions can be used to describe a rule. For example, a rule can be applied only to devices belonging to definition A or B but not to definition C. The rules further contain information regarding the set of users and computers to which the rule will be applied. Finally, the rule describes the reaction the software agent 108 will perform if a device connected to a computer matches the rule. For example, reactions the software agent 108 may include monitoring and reporting the connection of a device matching a rule's definition, blocking the device initialization, altering the access control list of the device, or limiting the data flow to the device, or notifying the user connecting the device that the device connection is monitored or not allowed. Once rules 112 are defined, they are deployed as part of policy 110. The policy 110 including its rules 112 are propagated to the computer systems 102 connected to network 104 via well-known means of policy distribution.

In step 208, when software agent 108 receives the policy, it registers an agent device connection listener to each device class on the agent's computer. For example, the device connection listener may be registered only to the sub set of devices class used in the device management rules and may be registered in the form of an upper level filter driver in the device class stack. Further, software agent 108 is responsible for registering the device connection listener to any new device class that is registered on the agent's computer system 102.

In step 210, the device connection listener monitors the device classes of computer system 102 to detect connection of a pluggable device to the agent's computer system 102. In response to detecting connection of a pluggable device to the agent's computer system 102, the device connection listener notifies software agent 108 about the connection and the attempt to initialize the device. The software agent 108 is notified about all the specific device parameters and uses these parameters to determine what reaction it should take based on one or more of the device management rules 112. The software agent 108, according to the reactions defined in the management rules 112, may take reactions such as blocking the initialization of the device or otherwise causing initialization to fail, altering the access control list of the device, or limiting the data flow to the device, notifying the user that the policy has been violated, and sending an event to the logging mechanism, all in accordance with the reactions defined within the device management rules.

The described method 200 allows the administrator to manage generic device types, based on parameters shared by all devices and retrieved by a device connection listener. In the preferred embodiment the device connection listener is a device class upper filter driver and provides the agent with general information about connected devices, regardless of the device type.

The method shown in FIG. 2 provides means to manage the connection of any device, regardless to its type. The described method may be further enhanced beyond using device parameters that are limited to general parameters shared by all device types and device management rules limited to using these common parameters for device identification. Instead, the method may be enhanced for specific device types, such as printers, removable media, and network adapters that may provide additional parameters, which the administrator can use to describe device definitions. In addition, rather than limiting the generic device management to preventing the initialization of the device, specific device type handling may allow a more fined tuned management scheme. For example management of removable storage devices can allow reading from files but prevent writing files, management of network adapters can block network connections based on the connection type (wireless), access point or other parameters available by network drivers.

To allow better management of specific device types the present invention includes device specific handling information 114 for specific device types. Policy 110, which contains a plurality of device definitions and device management rules, will also contain additional device specific information 114, such as a list of specific device type definitions and specific device type rules. For example, for handling the printer, the policy will contain device specific definitions and rules 116, such as printer device definitions and printer device rules. The software agent 108 provides a specific device type handler for each of the management component. Device type handlers may either replace or work in collaboration with the device connection listener to allow fine tuned management of the specific device type properties. Accordingly, the specific device type definitions will use parameters available to the device type manager to identify devices of that type. The reactions available in specific device management rules will include reactions that can be enforced by the specific device type manager.

Figure 3:
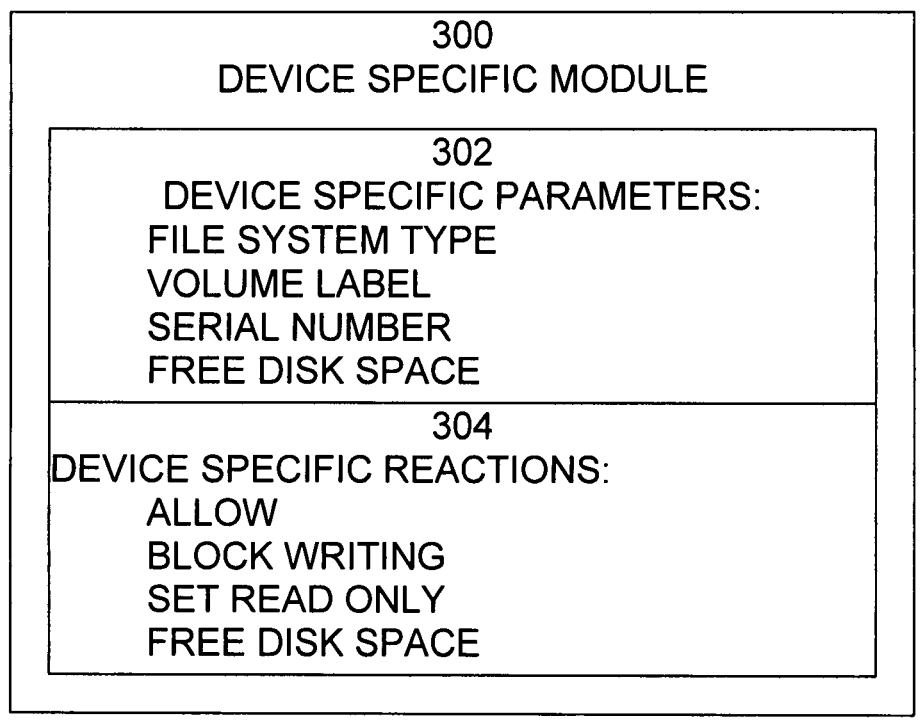
FIG. 3 is an exemplary module for management of removable storage devices.

One example of device specific modules is a specific module for management of removable storage devices. An example of such a module 300 is shown in FIG. 3. Removable storage devices can belong to various devices classes and therefore it is not convenient to manage them by blocking generic initialization of devices. Furthermore, removable storage devices can provide additional device specific parameters 302 which the administrator can use to determine the set of allowed devices. Examples of these parameters specific to removable storage are: File system type (NTFS, FAT), volume label, serial number, and free storage space. Device specific reactions 304 may be defined. For example, for a removable storage device, reactions to be taken may include: allowing the device to work, blocked only for writing or preventing any access to the device.

The removable storage handler may be implemented, for example, using a file filter driver 118 that is used for removable storage rules. Once a removable storage device is connected, the software agent's 108 removable storage handler (file filter driver 118, shown in FIG. 1) identifies that a new file system mount has been connected. The file filter driver 118 passes a request to the agent to collect the parameters identifying the removable storage device. These parameters are used by the agent to determine if the connected device should be managed by any of the management rule. The software agent 108 then informs the file filter driver 118 what management reactions should be applied to this device (mount). The file filter 118 driver keeps a mapping between each mapping device to the set of management rules that should be applied on it. When the file filter driver receives a request to open a file, it first checks if there are any restrictions on the requested mount. For example, if the mount is restricted to be read only, and the request is a file write request, the driver will fail the request.

CDROMs and burnable media devices are identified as mounted devices by the file filter driver. However, the file filter driver can not prevent burning a file system to this mount as it is not captured by open file requests. The Removable storage handler notifies the agent when a burnable device is mounted. The agent, running with system credentials can apply a reaction to prevent burning to the CDROM device. This reaction is applied by altering the device ACL, with system permissions, and preventing all users from having write permissions to this device. Another example of device specific modules is a specific module for management of network adapters. Management of network connections can include additional information not available for generic device management. Such information can include the type of network (wireless, LAN), the name of the network connection, bandwidth parameters and the presence of other networks connected simultaneously. Management of network devices can include restriction according to network protocol, or restriction according to specific access points, all in accordance to the information available by the network device management handler.

Figure 4:
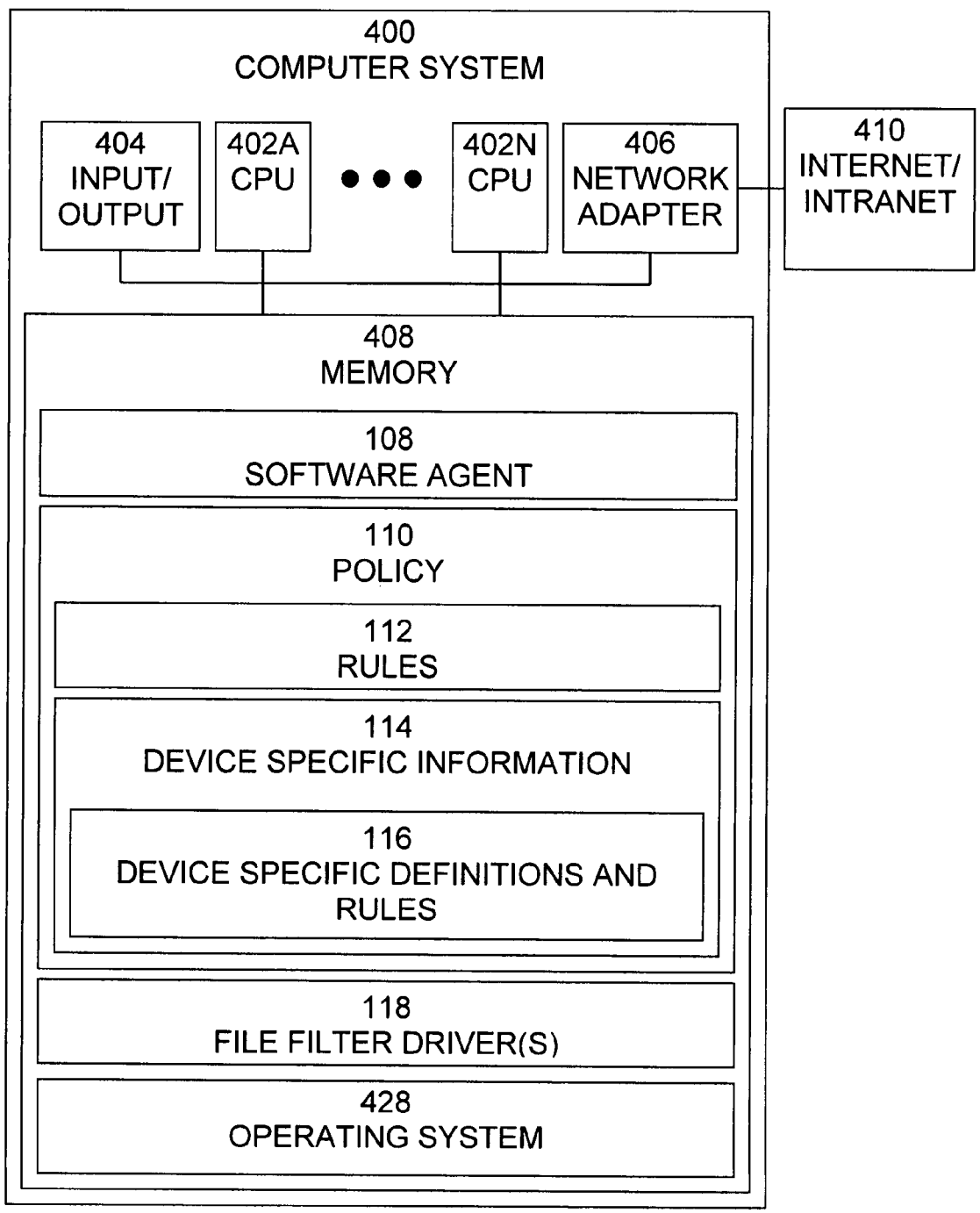
FIG. 4 is an exemplary block diagram of a computer system, in which the present invention may be implemented.

An exemplary block diagram of a computer system 400, in which the present invention may be implemented, is shown in FIG. 4. Computer system 400 is typically a programmed general-purpose computer system, such as a personal computer, workstation, server system, and minicomputer or mainframe computer. Computer system 400 includes one or more processors (CPUs) 402A-402N, input/output circuitry 440, network adapter 406, and memory 408. CPUs 402A-402N execute program instructions in order to carry out the functions of the present invention. Typically, CPUs 402A-402N are one or more microprocessors, such as an INTEL PENTIUM® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present invention also contemplates embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces computer system 400 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPUs 402A-N to perform the functions of computer system 400. Memory 404 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 408 varies depending upon the function that computer system 400 is programmed to perform. In the example shown in FIG. 4, memory 408 includes a software agent 108, and a policy 110, and file filter driver 118, and operating system 412. Software agent 108 performs a number of functions including tracking attempts to connect pluggable devices to computers, retrieving the device specific parameters and parameters concerning the identity of the computer hosting the device and the user logged to the computer, evaluating if the parameters violate any of a plurality of rules 112 of the policy 110 and blocking the initialization of the device if dictated by the policy. Software agent 108 also generates events describing the incident of a device plug, and reporting the event details to a logging server that can be viewed by the administrator. Policy 110 is a definition of the security behavior for computer system 108. Policy 110 addresses constraints on functions and flows among them, constraints on access by external systems and adversaries including programs and access to data by people. Policy 110 includes rules 112, which are definitions of generic parameters and values of those parameters that are used to determine the security behavior of computer system 108 with respect to pluggable/removable devices. Device specific information 114 includes a list of specific device type definitions and specific device type rules 116, such as printer device definitions and printer device rules. File filter driver 118 is used by software agent 108 for removable storage rules. Operating system 412 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for device management in a computer system comprising:

detecting connection of a device to the computer system, which includes a software agent that is configured to track attempts to connect pluggable devices to the computer system and to receive a security policy that includes a plurality of device management rules, wherein the software agent is further configured to register an agent device connection listener in a form of an upper-level filter driver in a device class stack for a particular device class defined in a particular one of the rules, and wherein the particular one of the rules describes a device definition, a set of computers, and a set of users to which the particular rule applies;

identifying a specific device type of the device; and determining a reaction to perform in response to the connection of the device to the computer system based, at least in part, on parameters related to the device and on the device management rules, wherein the reaction comprises blocking certain network connections based on identifying whether or not the connection is wireless.

2. The method of claim 1, wherein each device management rule comprises:

a combination of device definitions that will trigger the rule, each device definition corresponding to a device and comprising a plurality of parameters associated with the device;

information relating to the users and computer systems to which the rule will be applied; and a reaction to be performed when the rule is triggered.

3. The method of claim 2, wherein a reaction to be performed comprises at least one of:

monitoring and reporting connection of the device or existing device connections, blocking initialization of a device upon its connection, preventing writing to the particular files by the device, and notifying a user connecting the device that the device connection is monitored or blocked.

4. The method of claim 1, wherein the parameters related to the device definition comprise generic parameters associated with the device.

5. The method of claim 4, wherein the generic parameters comprise at least one of:

a device class, a device name, a bus type the device connects to, a vendor of the device, a product ID of the device, and a device specific serial number.

6. The method of claim 4, wherein the parameters related to the device further comprise device specific parameters related to the device and wherein a reaction to be performed comprises a device specific reaction.

7. The method of claim 6, wherein the device is a removable storage device and the device specific parameters comprise at least one of:

a file system type of the device, a volume label of the device, a serial number of the device, and free storage space on the device.

8. The method of claim 6, wherein the device is a network adapter and the device specific parameters comprise at least one of:

a type of network, a name of a network connection, bandwidth parameters and presence of other networks connected simultaneously.

9. The method of claim 8, wherein the device specific reaction comprises restriction according to network protocol, or restriction according to specific access points.

10. The method of claim 1, wherein the reaction comprises:

preventing access to certain files of the computer system by the device.

11. A system for device management in a computer system comprising:
- a processor operable to execute computer program instructions;
- a memory operable to store computer program instructions executable by the processor; and
- computer program instructions stored in the memory and executable to implement:
  - a device connection listener for detecting connection of a device to the computer system; and
  - a software agent for:
    - receiving a security policy that includes a plurality of device management rules, wherein the software agent is further configured to register an agent device connection listener in a form of an upper-level filter driver in a device class stack for a particular device class defined in a particular one of the rules, and wherein the particular one of the rules describes a device definition, a set of computers, and a set of users to which the particular rule applies,
    - determining a reaction to perform in response to the connection of the device to the computer system based, at least in part, on parameters related to the device and on the device management rules,
    - blocking certain network connections based on identifying whether or not the connection is wireless, and wherein the software agent is configured to track attempts to connect pluggable devices to the computer system.

12. The system of claim 11, wherein each device management rule comprises:
- a combination of device definitions that will trigger the rule, each device definition corresponding to a device and comprising a plurality of parameters associated with the device;
- information relating to the users and computer systems to which the rule will be applied; and
- a reaction to be performed when the rule is triggered.

13. The system of claim 12, wherein a reaction to be performed comprises at least one of:
- monitoring and reporting connection of the device or existing device connections, blocking initialization of the device upon its connection, preventing writing to the particular files by the device, and notifying a user connecting the device that the device connection is monitored or blocked.

14. The system of claim 11, wherein the parameters related to the device comprise generic parameters associated with the device.

15. The system of claim 14, wherein the generic parameters comprise at least one of:
- a device class, a device name, a bus type the device connects to, a vendor of the device, a product ID of the device, and a device specific serial number.

16. The system of claim 14, wherein the parameters related to the device further comprise device specific parameters related to the device and wherein a reaction to be performed comprises a device specific reaction.

17. The system of claim 16, wherein the device is a removable storage device, the device specific parameters comprise at least one of a file system type of the device, a volume label of the device, a serial number of the device, and free storage space on the device.

18. The system of claim 16, wherein the device is a network adapter, the device specific parameters comprise at least one of a type of network, a name of a network connection, bandwidth parameters and presence of other networks connected simultaneously, and the device specific reaction comprises restriction according to network protocol, or restriction according to specific access points.

19. A computer program product embodied in a non-transitory computer readable storage medium for performing operations, comprising:
- detecting connection of a device to the computer system, which includes a software agent that is configured to track attempts to connect pluggable devices to the computer system and to receive a security policy that includes a plurality of device management rules, wherein the software agent is further configured to register an agent device connection listener in a form of an upper-level filter driver in a device class stack for a particular device class defined in a particular one of the rules, and wherein the particular one of the rules describes a device definition, a set of computers, and a set of users to which the particular rule applies;
- identifying a specific device type of the device; and
- determining a reaction to perform in response to the connection of the device to the computer system based, at least in part, on parameters related to the device and on the device management rules, wherein the reaction comprises blocking certain network connections based on identifying whether or not the connection is wireless.

20. The computer program product of claim 19, wherein each device management rule comprises:
- a combination of device definitions that will trigger the rule, each device definition corresponding to a device and comprising a plurality of parameters associated with the device;
- information relating to the users and computer systems to which the rule will be applied; and
- a reaction to be performed when the rule is triggered.

21. The computer program product of claim 19, wherein the parameters related to the device comprise generic parameters associated with the device and the reaction to be performed comprises a generic reaction.

22. The computer program product of claim 21, wherein the generic parameters comprise at least one of a device class, a device name, a bus type the device connects to, a vendor of the device, a product ID of the device, and a device specific serial number.

23. The computer program product of claim 21, wherein the parameters related to the device further comprise device specific parameters related to the device and wherein a reaction to be performed comprises a device specific reaction.

24. The computer program product of claim 23, wherein the device is a removable storage device, the device specific parameters comprise at least one of a file system type of the device, a volume label of the device, a serial number of the device, and free storage space on the device.

25. The computer program product of claim 23, wherein the device is a network adapter, the device specific parameters comprise at least one of a type of network, a name of a network connection, bandwidth parameters and presence of other networks connected simultaneously, and the device specific reaction comprises restriction according to network protocol, or restriction according to specific access points.

\* \* \* \* \*